United States Patent
Hashimoto

(10) Patent No.: US 9,266,205 B2
(45) Date of Patent: Feb. 23, 2016

(54) PIPING SLIDER

(75) Inventor: Yuu Hashimoto, Toyama (JP)

(73) Assignee: YKK Corporation (JP)

( * ) Notice: Subject to any disclaimer, the term of this patent is extended or adjusted under 35 U.S.C. 154(b) by 274 days.

(21) Appl. No.: 13/805,634

(22) PCT Filed: Jun. 24, 2010

(86) PCT No.: PCT/JP2010/060771
§ 371 (c)(1),
(2), (4) Date: Dec. 19, 2012

(87) PCT Pub. No.: WO2011/161800
PCT Pub. Date: Dec. 29, 2011

(65) Prior Publication Data
US 2013/0093133 A1   Apr. 18, 2013

(51) Int. Cl.
| | | |
|---|---|---|
| *B25B 1/00* | (2006.01) | |
| *B43L 5/00* | (2006.01) | |
| *A44B 1/04* | (2006.01) | |
| *A44B 11/25* | (2006.01) | |
| *A44B 13/00* | (2006.01) | |
| *A41F 1/08* | (2006.01) | |
| *B23Q 3/18* | (2006.01) | |
| *A44B 99/00* | (2010.01) | |

(52) U.S. Cl.
CPC .. *B23Q 3/18* (2013.01); *A44B 99/00* (2013.01)

(58) Field of Classification Search
USPC .............. 269/86; 24/538, 614, 537, 542, 543, 24/517, 515, 265 EC, 487, 348, 349, 346, 24/343, 328, 72.5
See application file for complete search history.

(56) References Cited

U.S. PATENT DOCUMENTS

| | | | | |
|---|---|---|---|---|
| 1,110,579 A | * | 9/1914 | Seeber ............................. | 24/537 |
| 3,015,243 A | * | 1/1962 | Drader ............................. | 72/469 |
| 3,100,324 A | * | 8/1963 | Tutino et al. .................... | 24/346 |
| 3,235,928 A | * | 2/1966 | Clark ............................... | 24/517 |
| 3,241,352 A | * | 3/1966 | Lincourt ......................... | 72/457 |
| 3,345,061 A | * | 10/1967 | Schaefer ...................... | 269/246 |
| 3,452,691 A | * | 7/1969 | Ditrich ............................ | 112/2 |
| 3,610,022 A | * | 10/1971 | Lincourt ........................ | 72/457 |

(Continued)

FOREIGN PATENT DOCUMENTS

| | | | | |
|---|---|---|---|---|
| GB | 2078595 A | * | 1/1982 | ............... B25B 1/04 |
| JP | 48-30426 | | 9/1973 | |

(Continued)

OTHER PUBLICATIONS

International Search Report, PCT Application No. PCT/JP2010/060771, mailed Aug. 24, 2010.

*Primary Examiner* — Lee D Wilson
*Assistant Examiner* — Alvin Grant
(74) *Attorney, Agent, or Firm* — Kilpatrick Townsend & Stockton LLP

(57) ABSTRACT

A piping slider includes: a cavity in which a pipe-shaped part of an adherend is accommodatable; a slit that intercommunicates the cavity with an outside; a connector to which a belt is connected; a grip member in which the cavity and the slit are provided; a key member insertable into the slit; and a lock mechanism that restricts a displacement between the key member and the grip member when the key member is inserted into the slit, where an opening width of the slit is greater than a minimum width of the pipe-shaped part, and an opening width when the key member is inserted to the slit is smaller than the minimum width of the pipe-shaped part.

5 Claims, 20 Drawing Sheets

(56) References Cited

U.S. PATENT DOCUMENTS

| | | | |
|---|---|---|---|
| 3,924,303 A * | 12/1975 | Elliott | 24/537 |
| 4,669,152 A * | 6/1987 | Alexander | 24/30.5 R |
| 4,716,634 A * | 1/1988 | Fan | 24/545 |
| 5,388,313 A * | 2/1995 | Cameron | 24/537 |
| 5,944,236 A * | 8/1999 | Cinque | 223/1 |
| 6,427,292 B1 * | 8/2002 | Seifert | 24/265 EC |
| 6,698,071 B1 * | 3/2004 | Greer et al. | 24/537 |
| 7,438,278 B2 * | 10/2008 | Wagner | 254/22 |
| 8,756,771 B1 * | 6/2014 | Moreau et al. | 24/517 |
| 2005/0257353 A1 * | 11/2005 | Rohrig | 24/537 |
| 2007/0102858 A1 * | 5/2007 | Hlavinka et al. | 269/86 |
| 2009/0235497 A1 | 9/2009 | Pontaoe et al. | |
| 2013/0093133 A1 * | 4/2013 | Hashimoto | 269/86 |
| 2014/0190047 A1 * | 7/2014 | McCoy et al. | 38/102.91 |

FOREIGN PATENT DOCUMENTS

| | | |
|---|---|---|
| JP | 173914/1980 | 12/1980 |
| JP | 56-16087 | 4/1981 |
| JP | 68608/1982 | 4/1982 |
| JP | 191912/1984 | 12/1984 |
| JP | 4-38722 Y2 | 9/1992 |
| JP | 3836681 | 10/2006 |
| WO | 2009/117184 A2 | 9/2009 |
| WO | 2009/141942 A1 | 11/2009 |

* cited by examiner

PIPING SLIDER

This application is a national stage application of PCT/JP2010/060771 which is incorporated herein by reference.

TECHNICAL FIELD

The present invention relates to a piping slider, which specifically relates to a device for attaching an object to be attached (e.g. belt or string-shaped object) to a pipe-shaped part of an adherend.

BACKGROUND ART

Fasteners of various shapes have been utilized for mechanically attaching a to-be-attached object (sometimes simply referred to "object" hereinafter) to an adherend. For instance, buckles and the like are often used for the purpose of frequent attachment and detachment (e.g. for connecting belts and closing a flap of a bag).

A piping slider has been known as a fastener used in an application requiring no attachment/detachment (see Patent Literature 1). The piping slider is adapted to alter the attachment position of the adherend (see Patent Literature 2).

Patent Literature 1 discloses a piping slider arrangement for attaching a loop-shaped member (an object to be attached) to an end of a tape (adherend).

The loop-shaped member is molded of a synthetic resin material integrally with a block-shaped body. The body is provided with a longitudinally extending grip including a cylindrical cavity (cylindrical groove) and a slit (flat groove) narrower than the diameter of the cavity. A pipe-shaped part made of synthetic resin is integrally molded at an end of the tape. The grip catches the pipe-shaped part so that the loop-shaped member is attached at the end of the tape. According to the arrangement of Patent Literature 1, the pipe-shaped part is slid in an axial direction (width direction of the tape) to be delivered into the cavity and simultaneously drawing out the tape through the slit, thereby attaching the pipe-shaped part to the tape.

Patent Literature 2 discloses an arrangement in which a grip is adapted to be attached to a desired position on a longer pipe-shaped member. According to the arrangement, the pipe-shaped part is defined by forming a bag portion on a periphery of a sheet member continuous with the adherend and inserting a rod member of synthetic resin into the bag portion. The grip includes an openable cavity and a slit. A restriction member is attached to an outside of the cavity and the slit to restrict the grip from opening, thereby attaching the grip to the pipe-shaped part. Accordingly, the grip can, while being opened, be attached to an intermediate portion of the pipe-shaped part, in other words, the grip can be attached to a desired position on the pipe-shaped part.

Incidentally, it is possible to attach a fixed grip (i.e. a grip in which the cavity and slit are not openable) as disclosed in Patent Literature 1 may be attached to an elongated pipe-shaped member as disclosed in Patent Literature 2. However, since the grip is not openable, the grip cannot be attached to and detached from an intermediate position of the pipe-shaped part. Thus, the grip has to be inserted from an end of the pipe-shaped part for attachment.

CITATION LIST

Patent Literatures

Patent Literature 1 WO2009/141942A1
Patent Literature 2 WO2009/117184A2

SUMMARY OF THE INVENTION

Problems to be Solved by the Invention

Some of the piping sliders described above that employs fixed grip (i.e. the cavity and the slit are not openable) entails a difficulty in restoration when the grip is fallen off from the pipe-shaped part for some reason, because the grip cannot be attached to and detached from an intermediate portion of the pipe-shaped part.

The piping sliders are often used for a connecting portion between a shoulder belt and a chest strap of a rucksack. The chest strap is used for connecting the shoulder belts that are held on both shoulders at the front of the chest. The connecting position of the chest strap is desirably freely determined by a user, and a piping slider is suitable for that purpose. However, when the piping slider falls off during an outdoor activity, the piping slider is difficult to be restored, which sometimes keeps the user from an appropriate use of a rucksack after the piping slider falls off.

In view of the above deficiencies, the piping slider provided with the openable grip as disclosed in Patent Literature 2 may be used for easy restoration even when the grip falls off during an outdoor activity. Specifically, by loosening the restriction member and opening the grip (i.e. enlarging the slit so that the opening width of the slit becomes larger than the minimum width of the pipe-shaped part), the pipe-shaped part can be inserted from the opened slit into the cavity. Thus, the grip can be attached at a desired position of the pipe-shaped part and the grip can be easily restored even when being detached.

However, while the openable grip as disclosed in Patent Literature 2 can be easily restored when being detached, it is inevitable that the restriction member may be detached due to collision with the other article and the like and the grip is fallen off from the pipe-shaped part, so that the openable grip is less reliable as an attaching device.

Further, since the piping slider is provided by a grip portion and the restriction member and the restriction member is disposed to cover the grip portion, the size of the device is inevitably increased. Further, the grip is inevitably provided by two components (i.e. the grip portion and the restriction member), so that production cost is increased.

An object of the invention is to provide a piping slider in which the piping slider is significantly less likely to be fallen off and the disadvantages of the two-component arrangement can be eliminated.

Means for Solving the Problems

A piping slider according to an aspect of the invention includes: a cavity in which a pipe-shaped part of an adherend is accommodatable; a slit that intercommunicates the cavity with an outside; a connector to which an object is connected; a grip member on which the cavity and the slit are provided; a key member insertable into the slit; and a lock mechanism that restricts a displacement between the key member and the grip member when the key member is inserted into the slit, in which an opening width of the slit is greater than a minimum width of the pipe-shaped part and an opening width when the key member is inserted into the slit is smaller than the minimum width of the pipe-shaped part.

In the above aspect of the invention, the pipe-shaped part is accommodated within the cavity through the slit while the key member is not inserted into the slit and a sheet-shaped part continuous with the pipe-shaped part is drawn out of the slit. Next, the key member is inserted into the slit and keeps the key member from being disengaged through the slit by the lock mechanism. In this state, since a part of the slit is closed by the key member so that the opening width is reduced, the pipe-shaped part is unable to come out of the cavity through the slit. Thus, the pipe-shaped part is engaged with the grip member so that the object is attached to the adherend.

According to the above aspect of the invention, the piping slider can be attached to a desired position of the pipe-shaped part. Further, by releasing the lock mechanism and removing the key member, the pipe-shaped part can be easily attached to and detached from the grip member, so that the piping slider can be easily restored when being disengaged.

Further, since the key member for facilitating the attachment and detachment is accommodated in the slit, accidental detachment due to collision and the like can be restrained. In addition, a large projecting part is not provided on an outside of the grip member, so that the size of the device can be reduced as compared with the restriction member of the above-described Patent Literature 2.

In the above aspect of the invention, it is preferable that the connector includes an insertion hole provided in the grip member and an insertion hole provided in the key member, the insertion hole provided in the grip member and the insertion hole provided in the key member being provided at a position mutually in communication with each other when the key member is inserted into the slit.

According to the above arrangement, after the key member is inserted into the slit, an independent lock member is inserted into the insertion hole of the grip member and the insertion hole of the key member that are in communication with each other, so that the grip member and the key member are easily locked and the lock mechanism can be easily provided by the insertion holes also serving the lock mechanism.

The lock member may alternatively be a rod-shaped lock pin or a lock string that is bound after being inserted through the respective insertion holes. The insertion holes may be provided on a body of the grip member and the key member or alternatively be provided on an extension of each of the bodies extending outward.

In the above aspect of the invention, it is preferable that the lock mechanism is provided by integrally connecting the connector provided on the grip member and the connector provided on the key member with the object.

When the object is an elongated member such as a tape and a string, the object can be used as a lock member. At this time, each of the insertion holes can be provided in a loop shape for attaching the tape, where the lock mechanism also serves as the connector of the object and the object also serves as the lock member.

According to the above arrangement, the structure of the lock mechanism can be further simplified. In addition, the locked status can be maintained by the object passing through the insertion holes of the grip member and the key member, so that an erroneous releasing of the locked status can be substantially eliminated in use, thereby significantly enhancing the reliability of the device.

In the above aspect of the invention, it is preferable that the piping slider comprises a pair of slider members, each of the pair of slider members having the same shape in which the key member is connected to an extension of the slit of the grip member, the key member of one of the pair of slider members being insertable into the slit of the other of the pair of slider members, and the lock mechanism maintains a connection between the pair of slider members when the key members of the pair of slider members are inserted.

According to the above arrangement, the slit can be closed by the above key member with the use of the mutually engaging slider members. Further, the invention can be embodied by preparing one type of slider member having the key member and the grip member and using the slider member in a pair. In other words, the invention can be embodied with a single component.

In the above aspect of the invention, each of the pair of slider members includes a support member that connects the grip member and the key member.

According to the above invention, the grip member and the key member are arranged in a continuous direction of the pipe-shaped part and the key member inserted into the slit has to be provided by a thin rod-shaped member. Thus, the connection part between the grip member and the key member becomes thin and may sometimes be not strong enough. However, with the use of the support member, sufficient connection strength between the grip member and the key member can be ensured.

DESCRIPTION OF EMBODIMENT(S)

Figure 1:
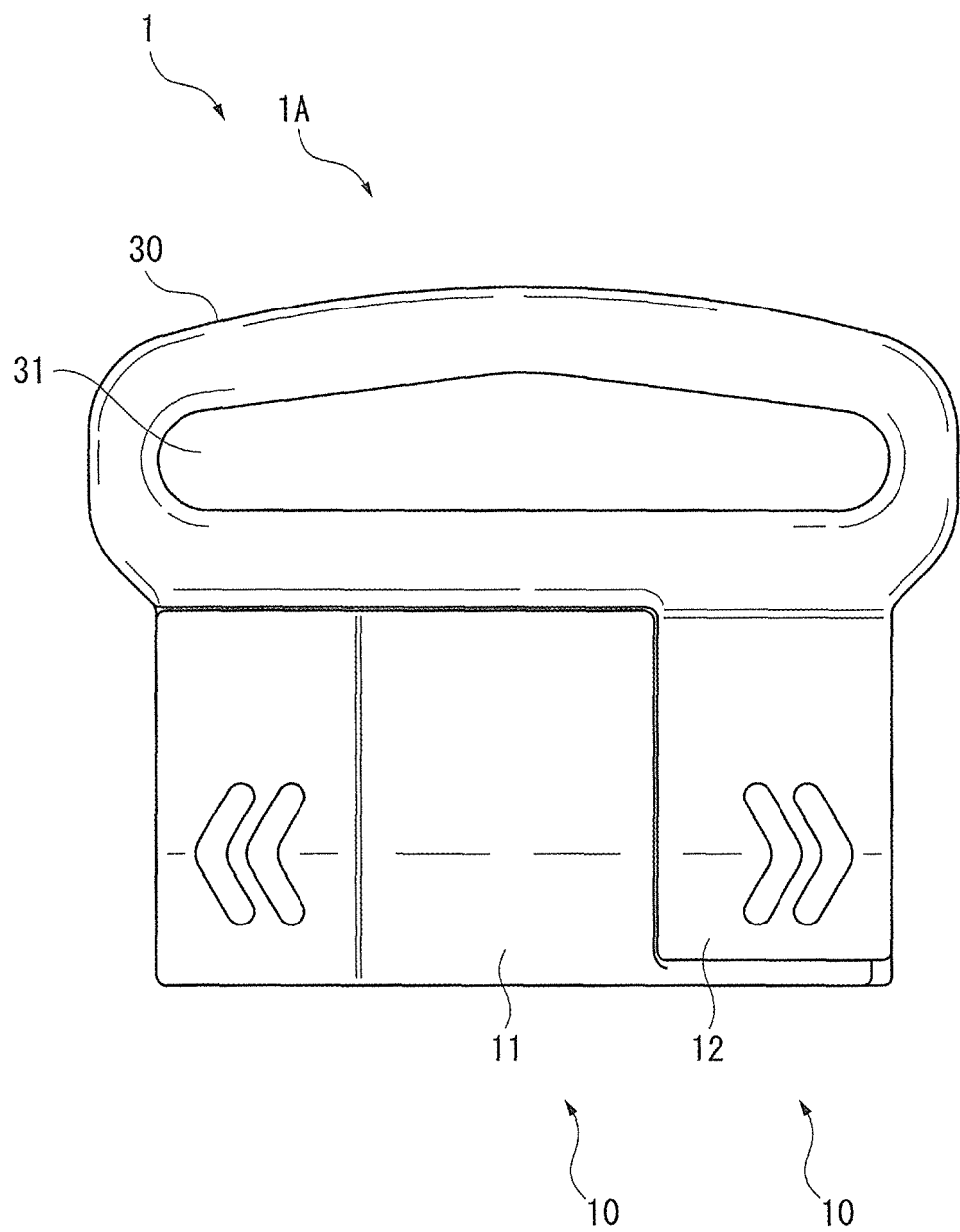
FIG. 1 is a front elevation showing a piping slider according to a first exemplary embodiment of the invention.
Figure 2:
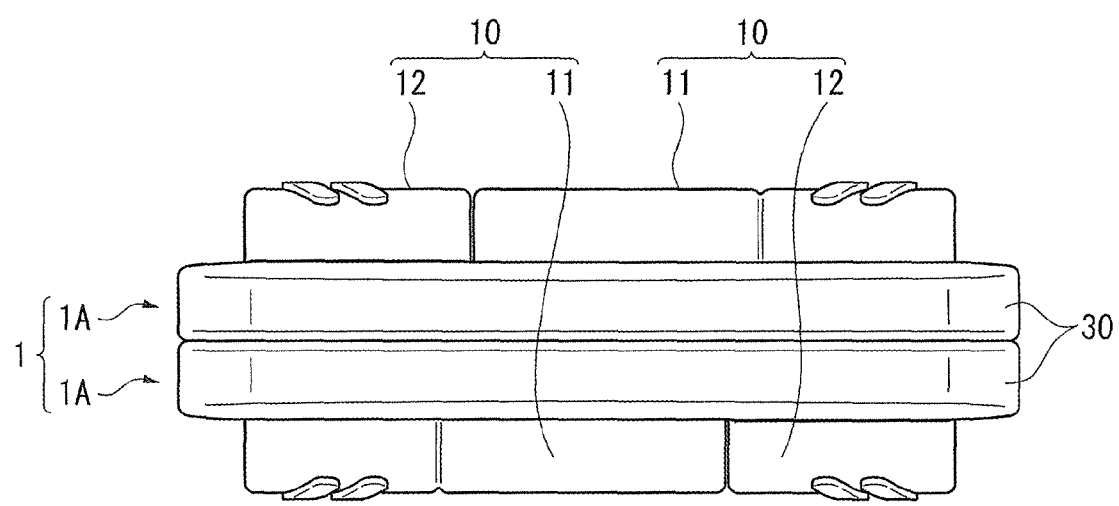
FIG. 2 is a plan view showing the piping slider according to the first exemplary embodiment.
Figure 3:
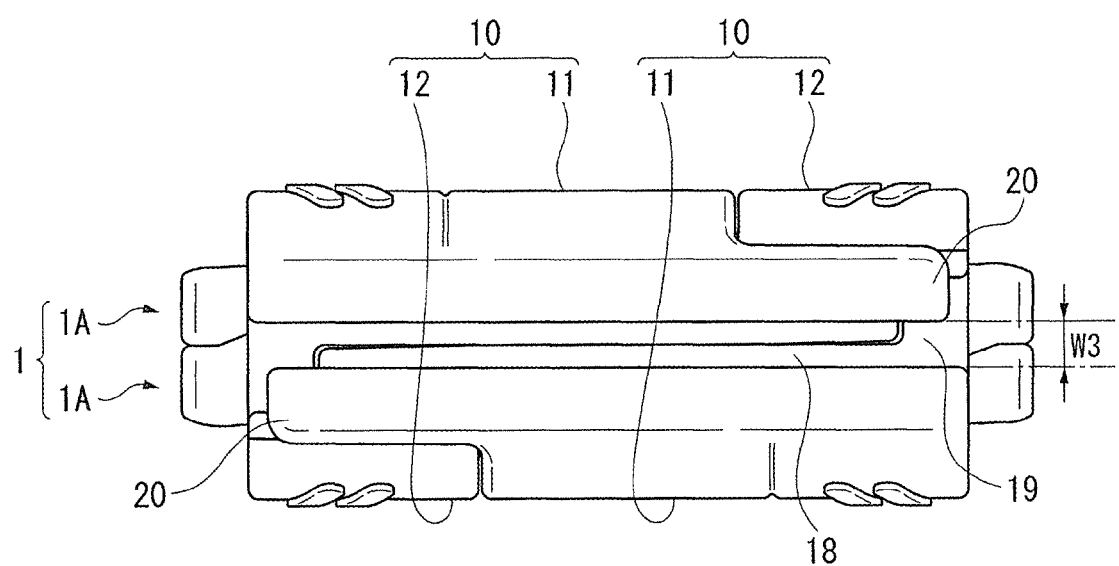
FIG. 3 is a bottom view showing the piping slider according to the first exemplary embodiment.

Exemplary embodiments of the invention will be described below with reference to the attached drawings.

First Exemplary Embodiment

FIGS. 1 to 4 show a piping slider 1 according to a first exemplary embodiment of the invention. The piping slider 1 is provided by two slider members 1A of the same shape and size, the two slider members 1A being engaged while facing with each other.

FIGS. 5 to 10 show the slider member 1A.

As shown in the respective figures, the slider member 1A includes a grip member 10 having a cavity 19 capable of receiving a pipe-shaped part of an adherend and a slit 18 for bringing the cavity 19 into communication with an outside, a key member 20 and a loop 30 (connector) to which a belt (object) is connected.

The grip member 10 is provided by bonding partially cylindrical first and second shells 11 and 12 in a manner facing with each other. The cavity 19 is defined between the first shell 11 and the second shell 12. The slit 18 is formed along the cavity 19 for bringing the cavity 19 into communication with the outside, the slit 18 being formed at a side at which the first shell 11 and the second shell 12 are not connected (see FIGS. 9 and 10).

The axial dimension of the first shell 11 is longer than that of the second shell 12. The first shell 11 and the second shell 12 are mutually connected with first ends thereof being aligned. Accordingly, the grip member 10 is cylindrical at the first end with the first shell 11 and the second shell 12 being aligned and covering the cavity 19 defined thereinside. On the other hand, the grip member 10 is semi-cylindrical at a second end opposite the aligned first end where the first shell 11 is projected lengthwise (see FIGS. 6, 7 and 8).

The key member 20 is provided by extending the projecting end of the first shell 11 of the grip member 10 in a direction in which the cavity 19 is extended. A side of the key member 20 and an end of the first shell 11 are connected by a support member 21. The support member 21 partially defines a cylindrical surface and surrounds the cavity 19 to define the cavity 19 in a cylindrical space (see FIGS. 5, 6 and 10).

As described above, a pair of the slider members 1A of the first exemplary embodiment with the same shape are engaged in a manner facing with each other to provide the piping slider 1 (see FIGS. 1 to 4). For that purpose, the slider members 1A are provided with a mechanism for mutual engagement.

The key member 20 and the support member 21 are provided on the first shell 11 of the grip member 10 of one of the slider members 1A (occasionally referred to as a first slider member 1A hereinafter) and are inserted into the second shell 12 of the other one of the slider members 1A (occasionally referred to as a second slider member 1A hereinafter) when the pair of slider members 1A are combined. Specifically, the key member 20 is longitudinally moved to be inserted into the slit 18 of the second slider member 1A. Then, the support member 21 is accommodated in a recess 17 (described later) facing the cavity 19 of the second slider members 1A.

The key member 20 is inserted into the slit 18 of the second slider member 1A and is disposed along an inner side of the second shell 12 defining the slit 18 of the second slider member 1A.

Figure 8:
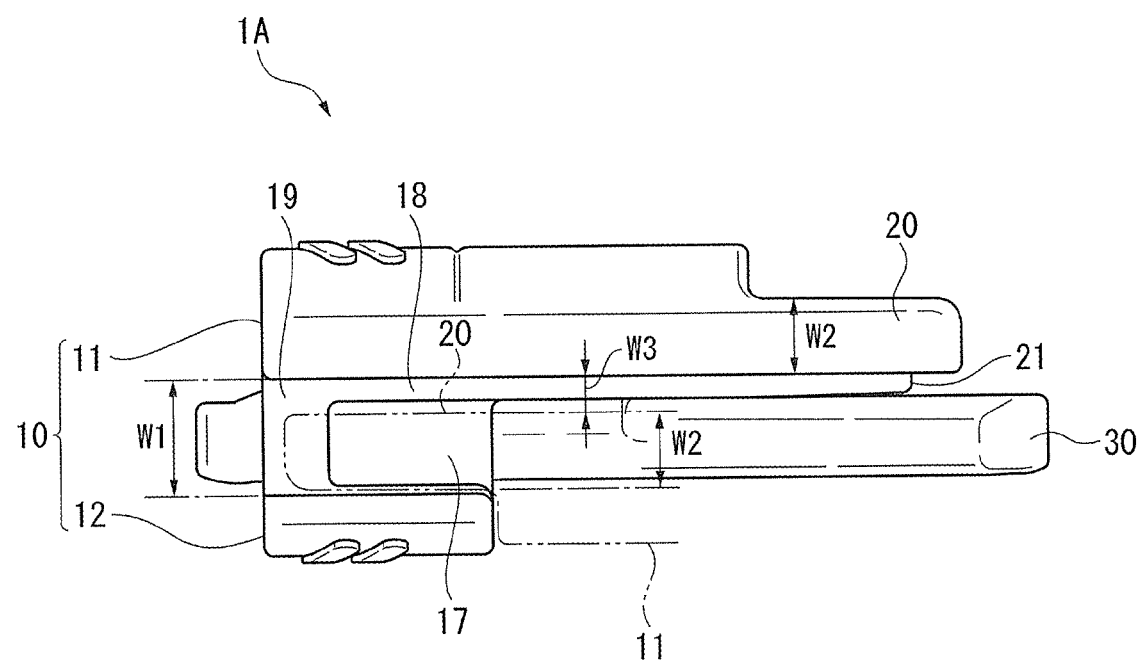
FIG. 8 is a rear elevation showing the slider member according to the first exemplary embodiment.
Figure 9:
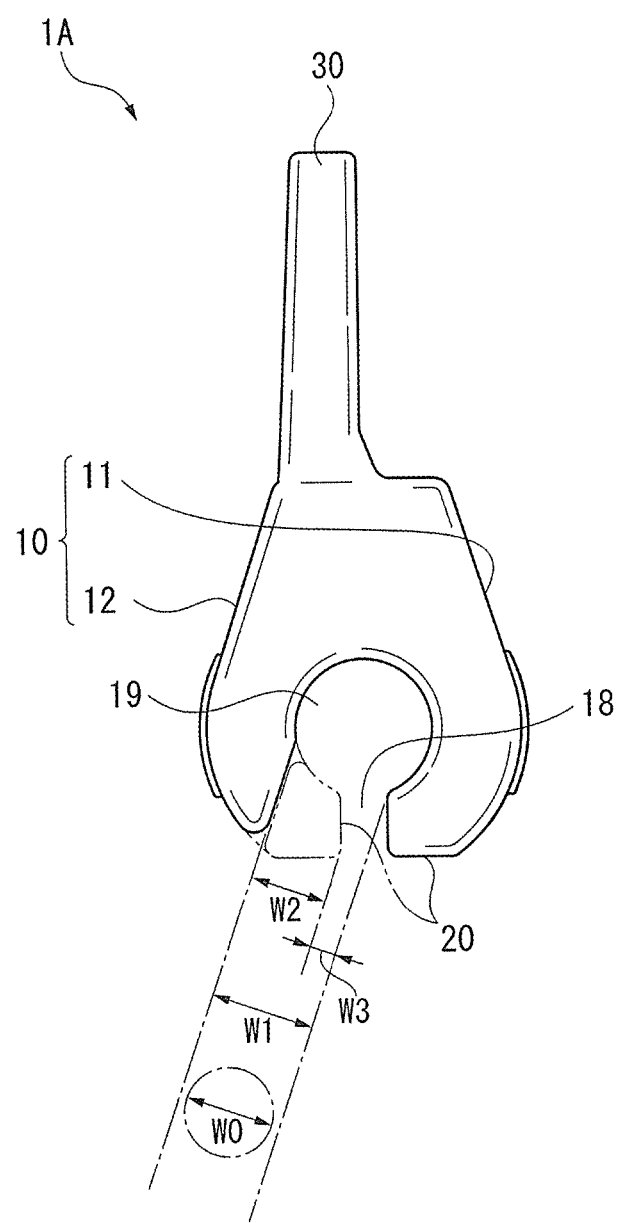
FIG. 9 is a left side elevation showing the slider member according to the first exemplary embodiment.
Figure 10:
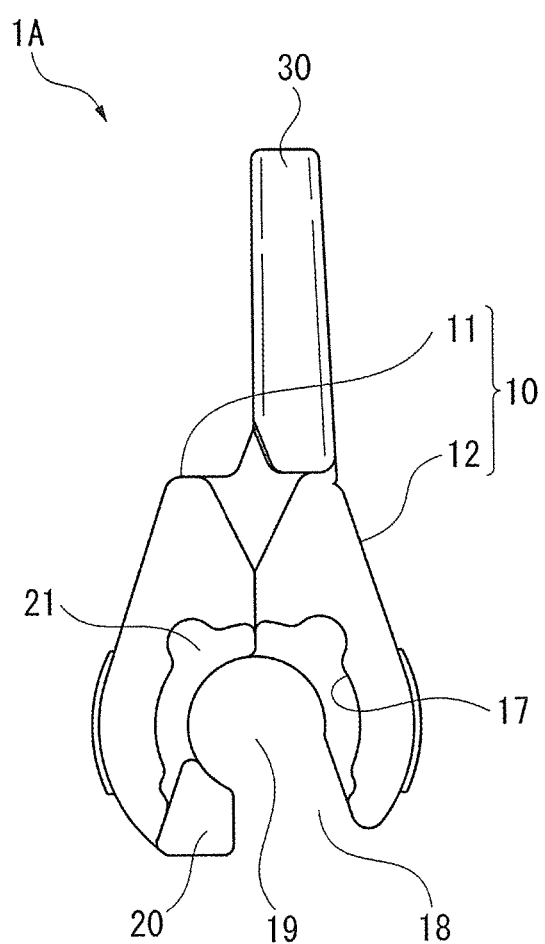
FIG. 10 is a right side elevation showing the slider member according to the first exemplary embodiment.

In the first exemplary embodiment, the inner sides of the first shell 11 and second shell 12 defining the slit 18 of the grip member 10 face with each other being spaced apart by a width W1 and the key member 20 has a width W2 (see FIGS. 8 and 9). Accordingly, when the key member 20 of the second slider member 1A is inserted into the slit 18 of the first slider member 1A, the width W1 of the slit 18 is narrowed by the key member 20 of the width W2 to leave the slit 18 of a width W3 along the first shell 11 (see FIGS. 3 and 4).

Figure 4:
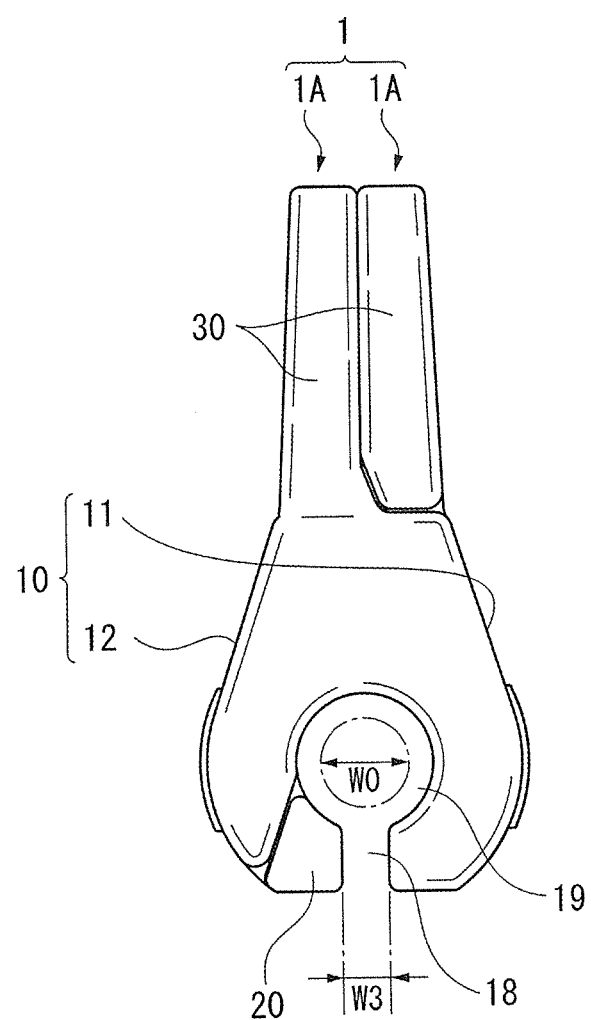
FIG. 4 is a left side elevation showing the piping slider according to the first exemplary embodiment.
Figure 5:
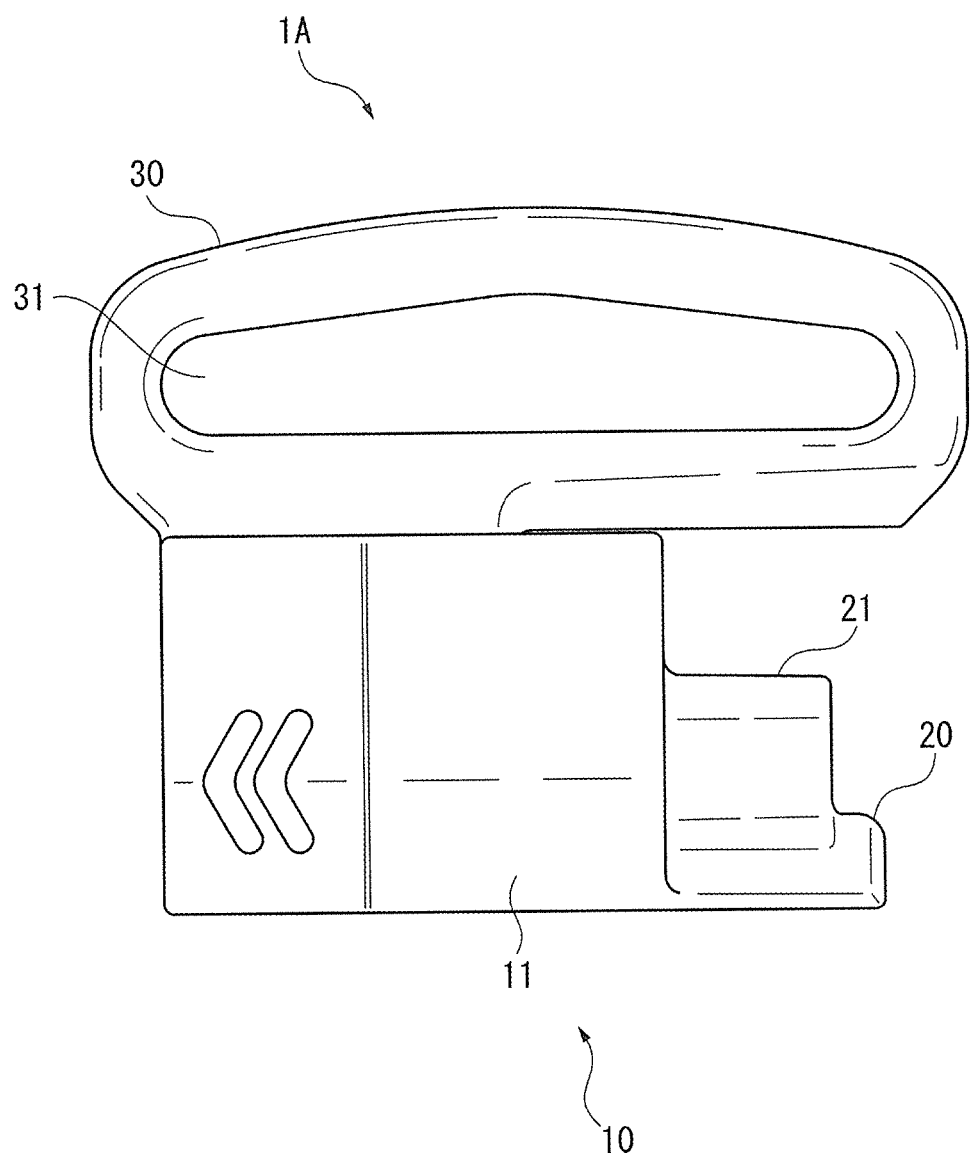
FIG. 5 is a front elevation showing a slider member according to the first exemplary embodiment.
Figure 6:
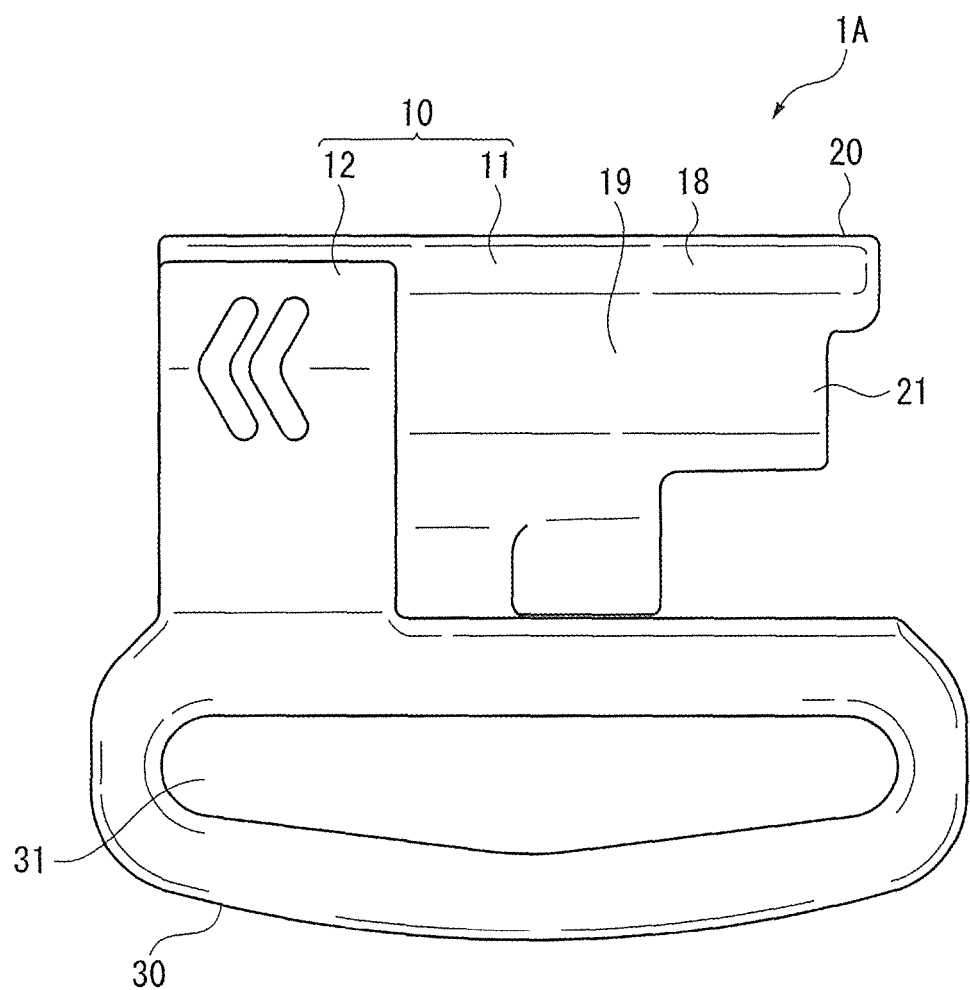
FIG. 6 is a rear elevation showing the slider member according to the first exemplary embodiment.
Figure 7:
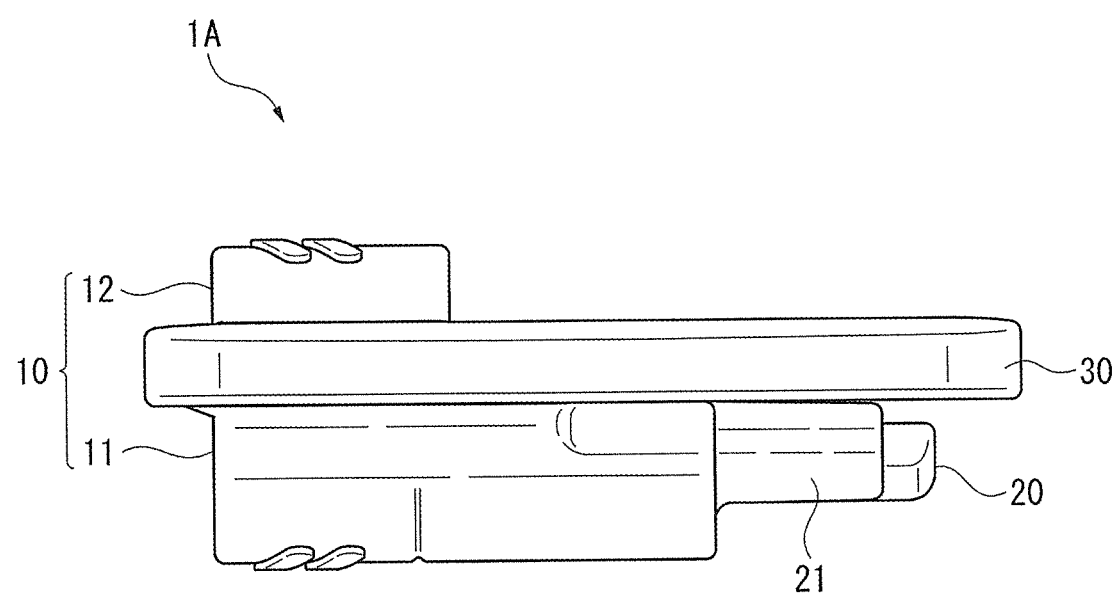
FIG. 7 is a plan view showing the slider member according to the first exemplary embodiment.

The width W1 of the original slit 18 (i.e. the width without the key member 20) of the grip member 10 is substantially the same as or slightly larger than a width W0 (minimum width) of the pipe-shaped part 2 to which the piping slider 1 is attached (see FIG. 9 or 4). Accordingly, when the key member 20 is not inserted to the slit 18, the pipe-shaped part 2 can be inserted into the cavity 19 through the slit 18 (see FIG. 9). However, once the key member 20 is inserted into the slit 18, since the slit 18 is narrowed to the width W3 (i.e. the opening width with the presence of the key member 20), the pipe-shaped part 2 of the width W0 cannot pass through the slit 18, so that the pipe-shaped part 2 having been accommodated in the cavity 19 cannot get out of the cavity 19 (see FIG. 4).

The recess 17 capable of accommodating the support member 21 is provided on the inner side facing the cavity 19 of the second shell 12.

When the pair of slider members 1A are combined, the key member 20 and the support member 21 of the second slider member 1A are inserted into the second shell 12. At this time, the support member 21 is accommodated in the recess 17 without bulging into the cavity 19, where the cavity 19 is left as a cylindrical space.

Figure 13:
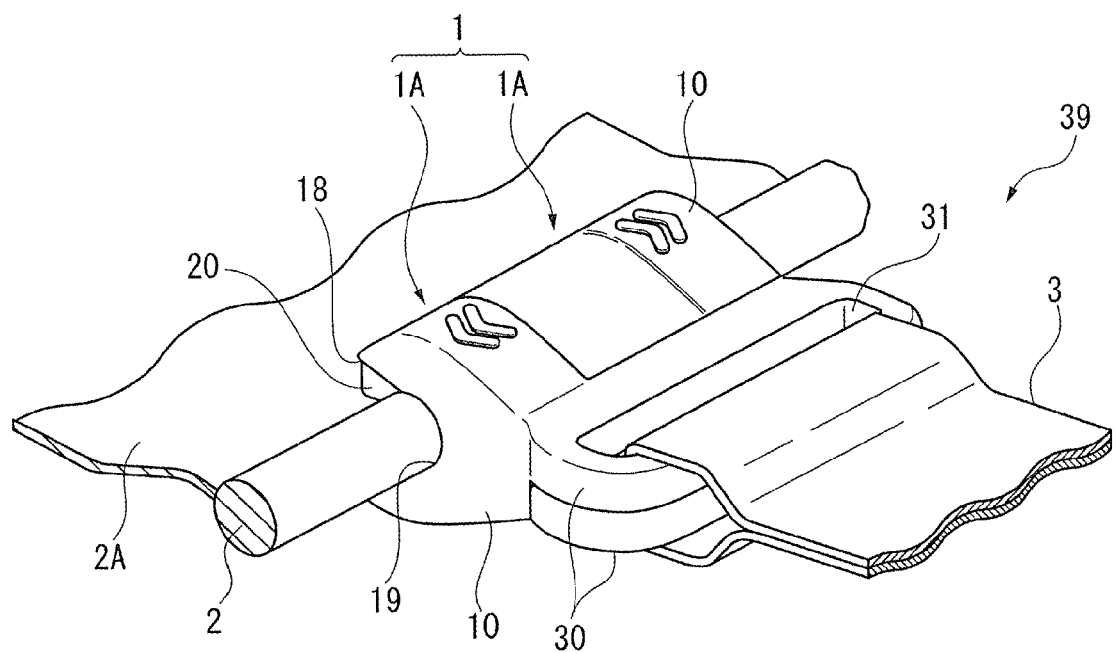
FIG. 13 is a perspective view showing the slider member according to the first exemplary embodiment after being attached.

The loop 30 is provided in a flat ring shape having an insertion hole 31 into which a belt is adapted to be inserted (see FIG. 13). The loop 30 is connected with a rear side (i.e. a side opposite the slit 18) of the first shell 11 of the grip member 10 and extends along the cavity 19. An end of the loop 30 is aligned with the aligned ends of the first shell 11 and the second shell 12 and the other end extends beyond the end of the key member 20.

Since the loop 30 is connected to the rear side of the first shell 11, when the pair of slider members 1A are combined, the respective loops 30 are overlapped in parallel with each other. Accordingly, when a belt is inserted into the mutually overlapped loops 30, the displacement of the loops 30 (and consequently the displacement of the pair of slider members 1A) is restricted so as to be inseparable.

In the first exemplary embodiment, the pair of loops 30 (connector) and the belt 3 (object) provides a lock mechanism 39 (see FIG. 13).

The slider member 1A is provided by the above-described grip member 10, the key member 20 and the loop 30. The entirety of the slider member 1A including the grip member 10, the key member 20 and the loop 30 is integrally molded by an injection molding of a synthetic resin and the like.

It should be noted that the support member 21 and the key member 20 are gently tapered so that the distal end of the support member 21 and the key member 20 in the direction for the slider member 1A to be inserted into the other slider member 1A is slightly thinner than the base end.

Further, the recess 17 is gently tapered so that the side from which the support member 21 of the second slider member 1A is inserted is slightly wider than the depth side.

In addition, the side of the loop 30 brought into slide contact with the rear side of the second shell 12 of the other slider member 1A when the pair of slider members 1A are combined is also gently tapered.

These tapered configurations increase friction resistance as the pair of slider members 1A are inserted toward depth side when the pair of slider members 1A are combined, so that the pair of slider members 1A are not easily disengaged even before the belt is inserted into the loop 30.

According to the above-described first exemplary embodiment, the attachment to the adherend is performed according to the following steps.

Figure 11:
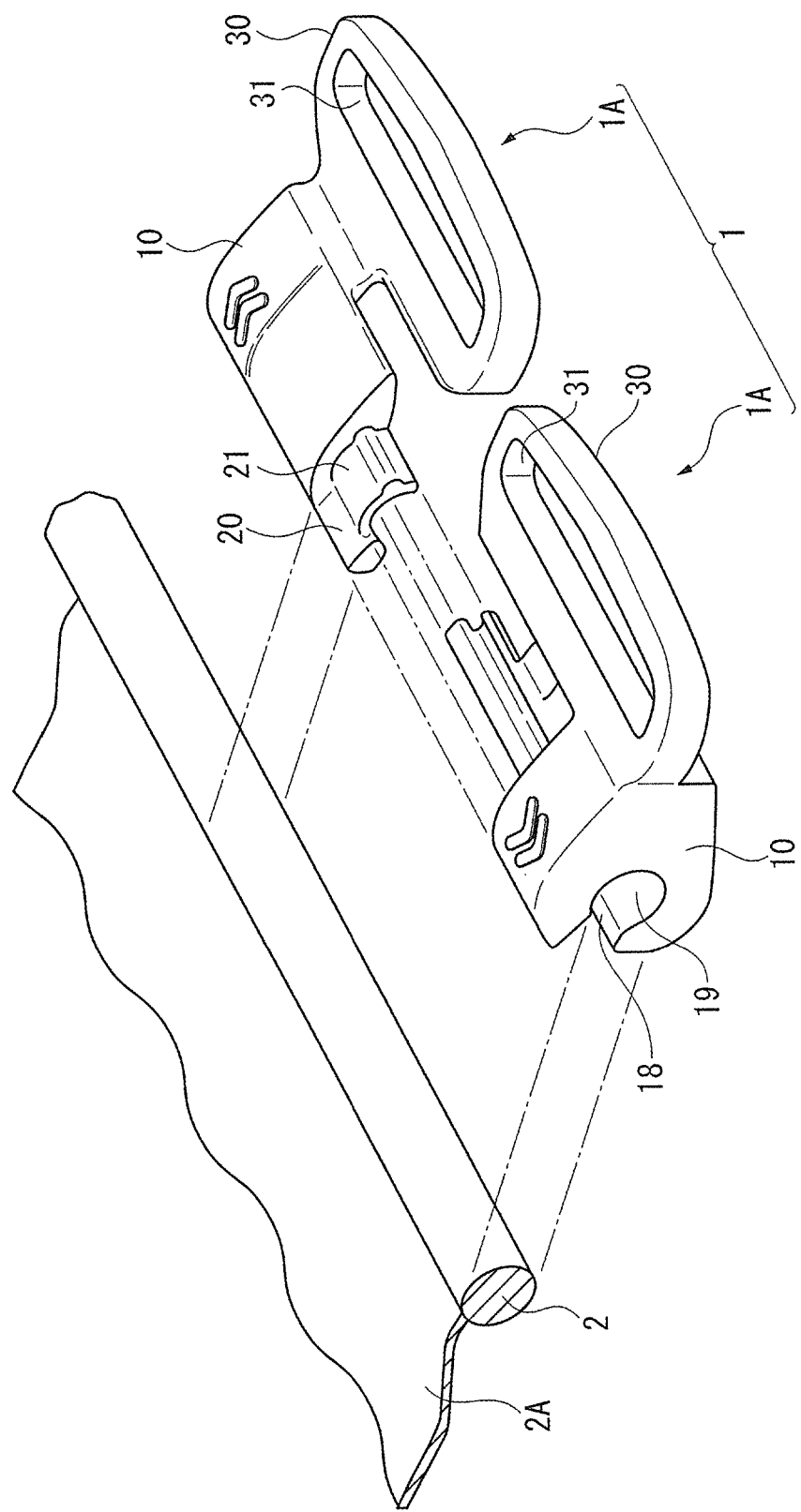
FIG. 11 is a perspective view showing the slider member according to the first exemplary embodiment before being attached.

As shown in FIG. 11, the pipe-shaped part 2 is continuously formed at a periphery of a sheet 2A. When being attached to the pipe-shaped part 2, the pair of slider members 1A providing the piping slider 1 are mutually separated in advance.

When being attached to the pipe-shaped part 2, after the pair of slider members 1A are mutually faced (i.e. in a state where the distal ends of each of the key members 20 are faced), the pipe-shaped part 2 is inserted into the slits 18 of each of the pair of slider members 1A to be accommodated in the cavity 19. At this time, since the slits 18 of each of the slider members 1A have a sufficient opening width, the pipe-shaped part 2 can be smoothly inserted.

Next, the pair of slider members 1A are moved along the pipe-shaped part 2 so as to become closer with each other.

Figure 12:
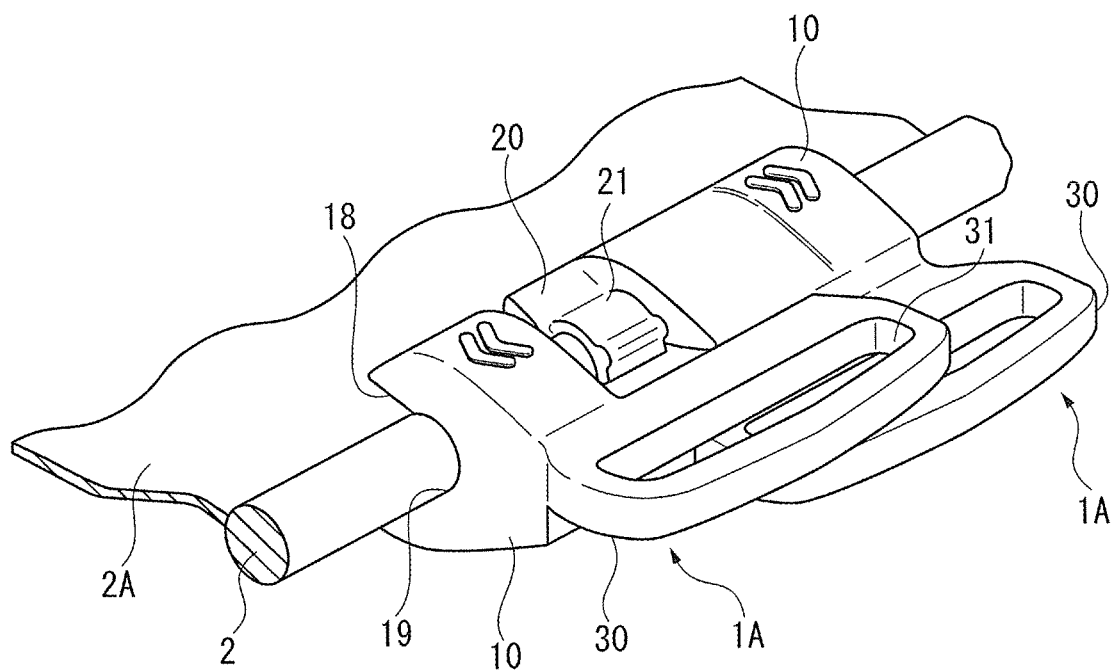
FIG. 12 is a perspective view showing the slider member according to the first exemplary embodiment while being attached.

As shown in FIG. 12, when the pair of slider members 1A are moved closer with each other, the key member 20 of each of the pair of slider members 1A enters the slit 18 of the mating grip member 10. Subsequently, the support member 21 enters the recess 17 of the grip member 10 and then the loops 30 of the pair of slider members 1A become overlapped.

As shown in FIG. 13, the piping slider 1 is formed by completely connecting the pair of slider members 1A. At this time, the opening width of the slit 18 is narrowed by the key member 20 and the insertion holes 31 of the loops 30 are aligned.

In this state, when the belt 3 is inserted into the insertion hole 31, the belt 3 (object to be attached) is attached to the pipe-shaped part 2 and the sheet 2A (adherend) via the piping slider 1.

At this time, since the key member 20 is inserted into the slit 18, the opening width of the slit 18 is narrowed relative to the minimum width of the pipe-shaped part 2, so that the pipe-shaped part 2 does not get out from the cavity 19 and the belt 3 (object to be attached) and the pipe-shaped part 2 and the sheet 2A (adherend) are securely attached by the piping slider 1.

Further, the lock mechanism 39 is provided by inserting the belt 3 into the insertion holes 31 of the pair of slider members 1A, where the pair of slider members 1A are obliged to displace along the pipe-shaped part 2, thereby keeping the connection and, consequently, locking the components.

On the other hand, the above displacement restriction can be released by pulling out the belt 3 again, so that the pair of slider members 1A can be separated for removal from the pipe-shaped part 2.

When the belt 3 is made of a soft material or the width of the belt 3 is sufficiently narrower than the insertion hole 31, the above-described displacement restriction can be eased by slimming the width of the belt 3 inside the insertion hole 31, where it is possible to relatively displace and separate the pair of slider members 1A.

However, when tension is applied on the belt 3, the belt 3 cannot be slimmed or the like, so that an unexpected separation of the pair of slider members 1A can be avoided.

Second Exemplary Embodiment

In the above-described first exemplary embodiment, the slider member 1A is provided by connecting the key member 20 to the grip member 10 including the cavity 19 and the slit 18 and the piping slider 1 is provided by combining a pair of the slider members 1A.

The piping slider 1 of the invention may not be provided by the pair of slider members 1A of the same shape but may alternatively be provided by combining different components including a grip component mainly including the grip member 10 having the cavity 19 and the slit 18, and a key component including the key member 20.

Figure 14:
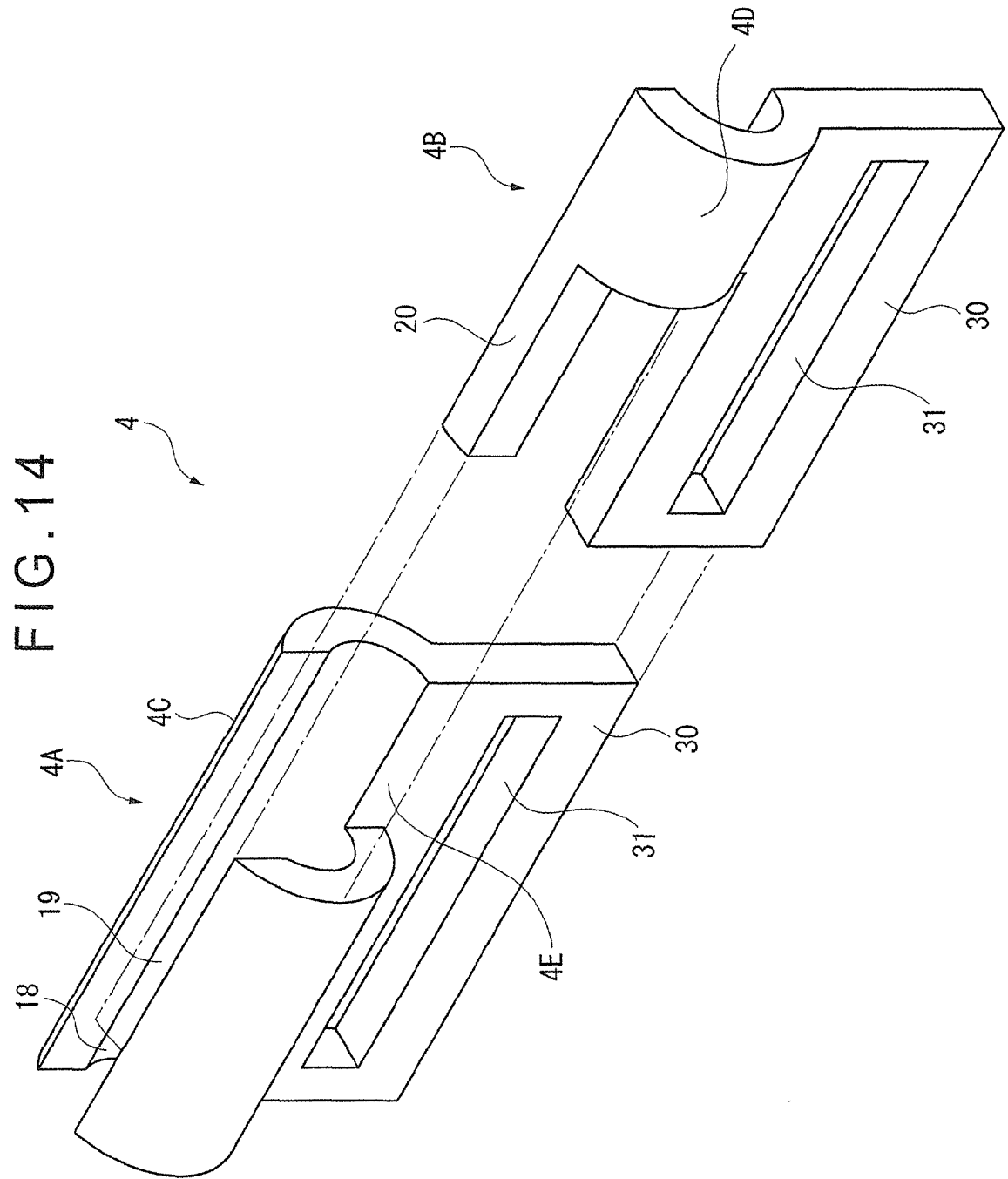
FIG. 14 is an exploded perspective view showing a piping slider according to a second exemplary embodiment of the invention.
Figure 15:
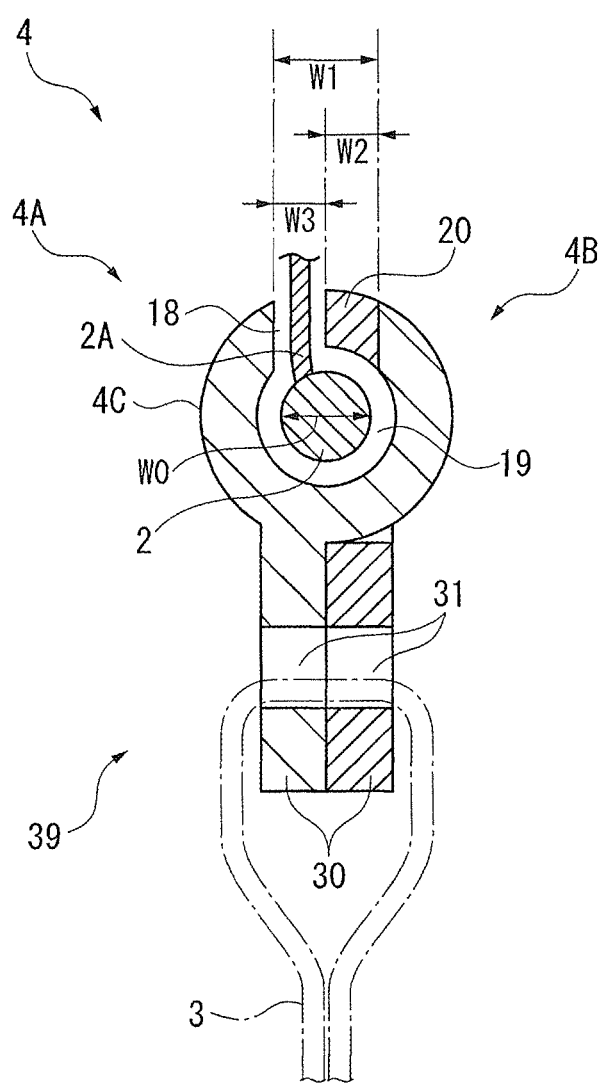
FIG. 15 is a cross section showing the piping slider according to the second exemplary embodiment.

FIGS. 14 and 15 show a second exemplary embodiment of the invention.

As shown in the figures, a piping slider 4 of the second exemplary embodiment is provided by two components, i.e. a grip component 4A and a key component 4B.

The grip component 4A includes a cylindrical grip member 4C. The grip member 4C includes the cavity 19, the slit 18 and the loop 30 similar to those described in the first exemplary embodiment. As shown in FIG. 15, the width W1 of the slit 18 is the same as or slightly larger than a width W0 equal to the diameter (minimum width) of the pipe-shaped part 2 of the sheet 2A (adherend).

The loop 30 of the grip component 4A is provided on a side opposite the slit 18 of the grip member 4C. The loop 30 has the insertion hole 31 for the belt 3 to be inserted as in the first exemplary embodiment.

The key component 4B includes the key member 20 and the loop 30 similar to those of the first exemplary embodiment. The key member 20 and the loop 30 are connected by a semi-cylindrical auxiliary member 4D.

The auxiliary member 4D has a cylindrical surface similar to that of the grip member 4C of the grip component 4A. When the grip component 4A and the key component 4B are combined, the auxiliary member 4D is disposed at a cutout portion 4E of the grip member 4C to define a series of cylindrical shapes.

The loop 30 of the key component 4B has a shape corresponding to the loop 30 of the grip component 4A, the loop 30 providing a part of the lock mechanism 39. The loops 30 are mutually overlapped when the grip component 4A and the key component 4B are combined in the same manner as the first exemplary embodiment and are locked by inserting the belt 3.

The key member 20 is inserted into the slit 18 of the grip component 4A to narrow the opening width of the slit 18.

The slit 18 has an opening width (i.e. a width without the presence of the key member 20) of the width W1. However, as described above, the opening width of the slit 18 is the width W3 when the key member 20 of the width W2 is inserted (see FIG. 15).

Accordingly, in the absence of the key member 20 (i.e. when the grip component 4A and the key component 4B are engaged), the pipe-shaped part 2 of the width W0 can be introduced into the cavity 19 or taken out of the cavity 19 through the slit 18.

However, once the key member 20 is inserted (i.e. when the grip component 4A and the key component 4B are engaged), the pipe-shaped part 2 of the width W0 cannot be introduced into or taken out of the cavity 19 through the slit 18.

According to the piping slider 4 of the second exemplary embodiment, the belt 3 (object to be attached) is securely attached to the pipe-shaped part 2 and the sheet 2A (adherend) in the same manner as the piping slider 1 of the first exemplary embodiment.

Further, the lock mechanism 39 is provided by inserting the belt 3 into the insertion holes 31 of the grip component 4A and the key component 4B so as to lock the grip component 4A and the key component 4B in an engaged state.

On the other hand, the piping slider 4 of the second exemplary embodiment does not employ the two slider members 1A of the same shape as in the first exemplary embodiment, so that the grip component 4A and the key component 4B have to be separately manufactured.

Third Exemplary Embodiment

Figure 16:
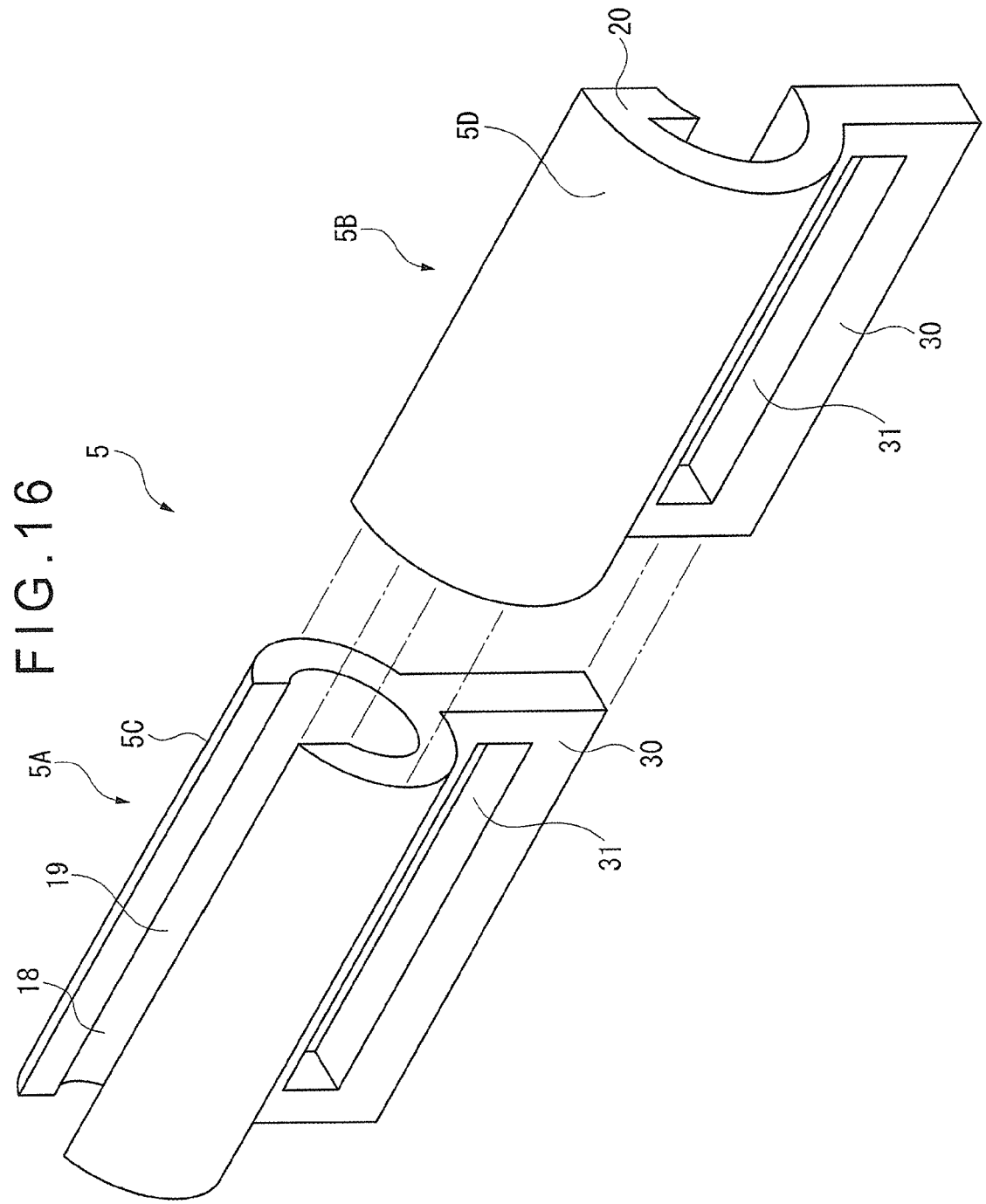
FIG. 16 is an exploded perspective view showing a piping slider according to a third exemplary embodiment of the invention.
Figure 17:
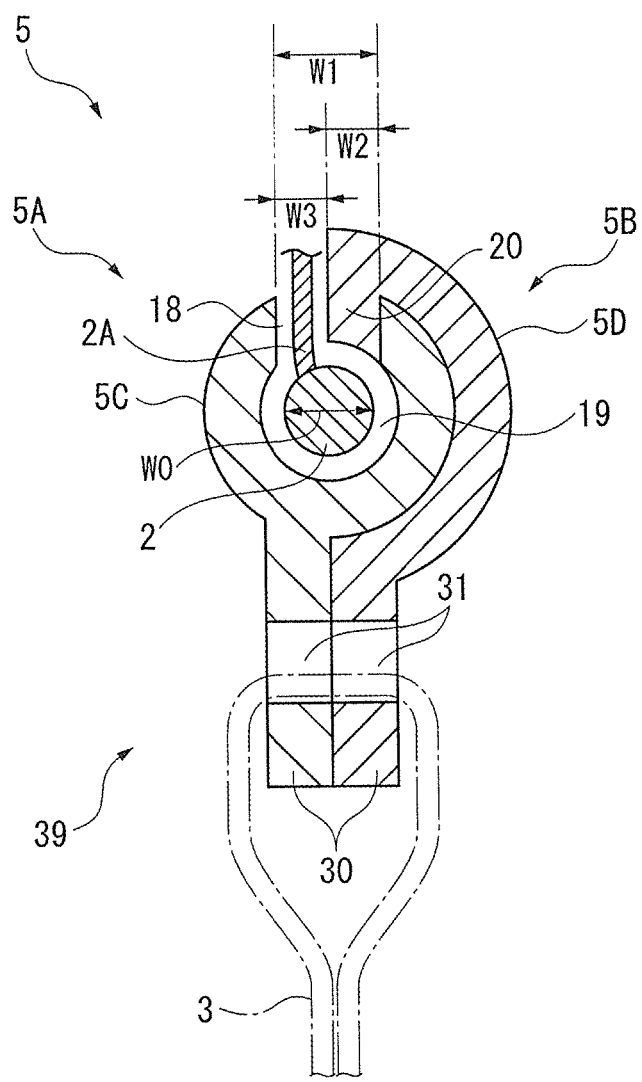
FIG. 17 is a cross section showing the piping slider according to the third exemplary embodiment.

FIGS. 16 and 17 show a third exemplary embodiment of the invention.

As shown in the figures, a piping slider 5 of the third exemplary embodiment is provided by two components, i.e. a grip component 5A and a key component 5B.

The grip component 5A includes a cylindrical grip member 5C. The grip member 5C includes the cavity 19, the slit 18 and the loop 30 similar to those described in the first exemplary embodiment.

The grip member 5C of the third exemplary embodiment is the same as the grip member 4C of the second exemplary embodiment except that the cutout portion 4E is not present and the axial lengths of both sides of the slit 18 are the same.

The key component 5B includes the key member 20 and the loop 30 similar to those of the first exemplary embodiment. The key member 20 and the loop 30 are connected by a semi-cylindrical auxiliary member 5D.

The auxiliary member 4D of the key component 4B of the second exemplary embodiment is provided near a first end of the key member 20 and the loop 30 so that the auxiliary member 4D is integrated with the grip member 4C when the grip component 4A and the key component 4B are engaged. In contrast, the key member 5B of the third exemplary embodiment has a cylindrical surface of which radius of curvature is slightly larger than that of the grip member 4C and is formed to connect the key member 20 and the loop 30 over the entire length thereof. Accordingly, when the grip component 5A and the key component 5B are engaged, the auxiliary member 5D covers an outside of the grip member 5C.

According to the third exemplary embodiment, when the grip component 5A and the key component 5B are not engaged (i.e. when the key member 20 is not inserted into the slit 18), the pipe-shaped part 2 of the width W0 can be introduced into the cavity 19 or taken out of the cavity 19 through the slit 18.

However, once the grip component 5A and the key component 5B are engaged (i.e. when the key member 20 is inserted into the slit 18), the pipe-shaped part 2 of the width W0 cannot be introduced into or taken out of the cavity 19 through the slit 18. This state is maintained by the lock mechanism 39 including the pair of loops 30 and the belt 3.

Thus, the same advantages as in the above second exemplary embodiment can be obtained by the third exemplary embodiment.

Fourth Exemplary Embodiment

In the above-described first and third exemplary embodiments, the loop 30 also serving as the connector is provided on each of the pair of components, into which the belt 3 is inserted to provide the lock mechanism 39. However, the lock mechanism 39 and the connector of the invention may not be provided by the pair of loops 30.

Figure 18:
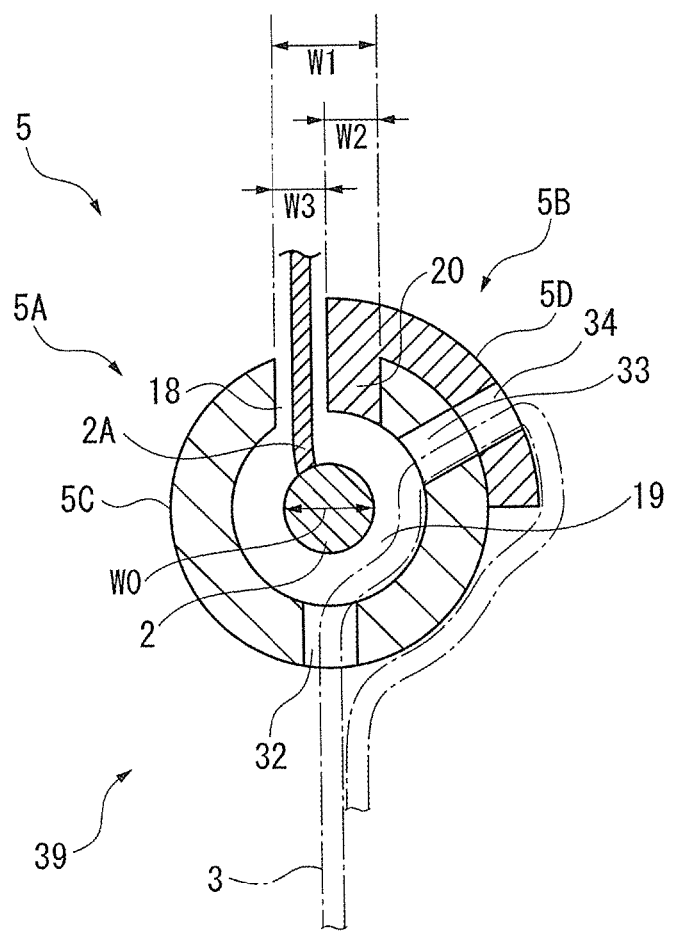
FIG. 18 is a cross section showing a piping slider according to a fourth exemplary embodiment of the invention.

FIG. 18 shows a fourth exemplary embodiment of the invention.

As shown in the figure, the grip component 5A and the key component 5B are the same as those of the third exemplary embodiment except that the loop 30 is not provided to the grip component 5A and the key component 5B. Alternatively, two insertion holes 32 and 33 into which the belt is insertable are provided on the grip member 5C of the grip component 5A and an insertion hole 34 is provided on the auxiliary member 5D of the key component 5B.

When the grip component 5A and the key component 5B are engaged and the key member 20 is inserted into the slit 18, the insertion hole 33 of the grip component 5A and the insertion hole 34 of the key component 5B are in communication with each other. Then, the belt 3 is inserted into the insertion holes 32, 33 and 34 so that the grip component 5A and the key component 5B are locked while being engaged.

The connector of the belt and the lock mechanism 39 may be provided by the above arrangement.

Fifth Exemplary Embodiment

In the above-described first and fourth exemplary embodiments, the insertion hole of the belt is provided on each of the pair of components, which is used for the lock mechanism 39 and the connector. However, the lock mechanism 39 of the invention may not be also used as the connector.

Figure 19:
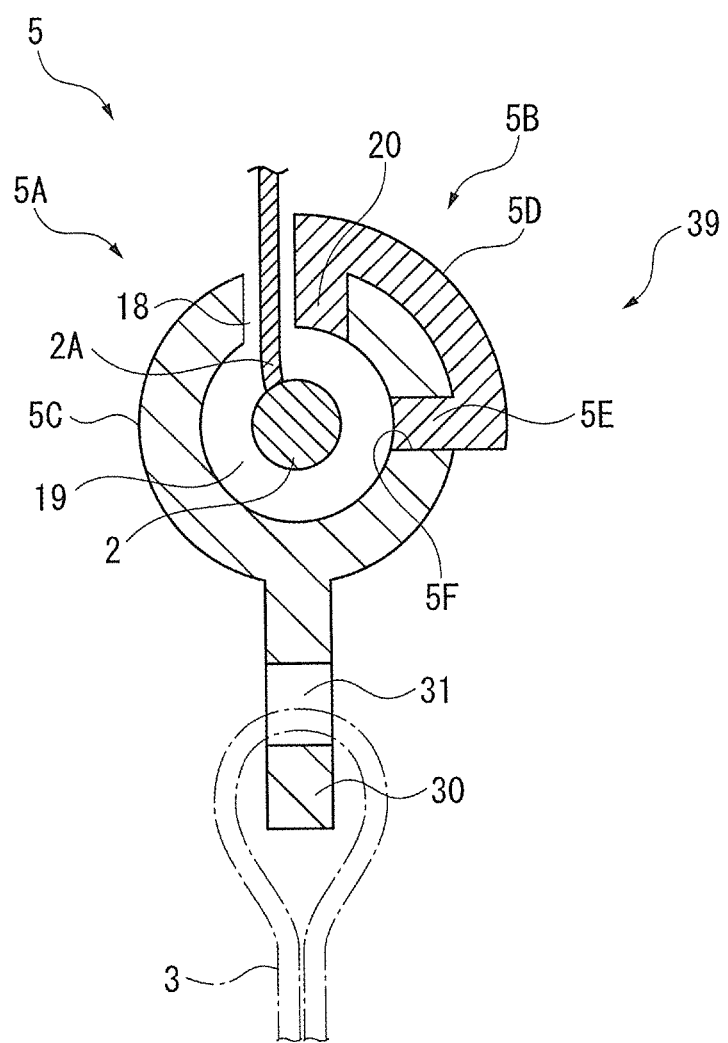
FIG. 19 is a cross section showing a piping slider according to a fifth exemplary embodiment of the invention.

FIG. 19 shows a fifth exemplary embodiment of the invention.

As shown in the figure, the grip component 5A and the key component 5B are the same as those in the third exemplary embodiment except that the loop 30 of the key component 5B is not present, an inwardly-facing pin 5E is provided on the auxiliary member 5D and a pin hole 5F is provided on the grip member 5C of the grip component 5A.

When the grip component 5A and the key component 5B are engaged and the key member 20 is inserted into the slit 18, the pin 5E of the key component 5B is engaged with the pin hole 5F of the grip component 5A. Since the pin hole 5F is engaged with the pin 5E in a direction intersecting with the engagement between the key member 20 and the slit 18, the engagements between the pin hole 5F and the pin 5E and between the key member 20 and the slit 18 locks the grip component 5A and the key component 5B while the grip component 5A and the key component 5B are engaged (i.e. the pin hole 5F and the pin 5E provide the lock mechanism 39).

On the other hand, since the loop 30 is provided to the grip component 5A, the belt 3 can be attached to the insertion hole 31 of the loop 30. The loop 30 provides the connector.

Sixth Exemplary Embodiment

Figure 20:
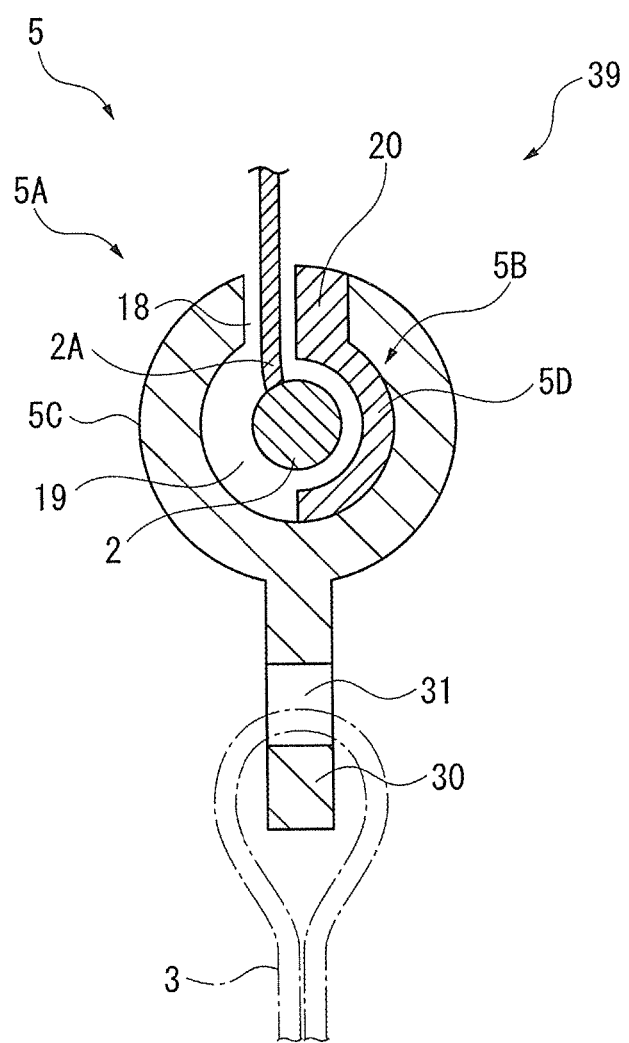
FIG. 20 is a cross section showing a piping slider according to a sixth exemplary embodiment of the invention.

FIG. 20 shows a sixth exemplary embodiment of the invention.

As shown in the figure, the grip component 5A is the same as that of the third exemplary embodiment except that the loop 30 is not provided to the key component 5B and the auxiliary member 5D is provided inside the grip member 5C and inside the cavity 19.

When the grip component 5A and the key component 5B are engaged, the key member 20 is inserted into the slit 18 and the auxiliary member 5D is disposed in the cavity 19. In use, the pipe-shaped part 2 is disposed in the cavity 19 and the key component 5B is inserted from an end of the grip member 5C along the pipe-shaped part 2. The key component 5B accommodated within the cavity 19 cannot come out of the slit 18 due to the presence of the pipe-shaped part 2. For instance, a convexoconcave engagement (e.g. pin and pin hole) may be provided between the auxiliary member 5D and the grip member 5C to restrict the displacement in a direction along the pipe-shaped part 2, thereby providing the lock mechanism 39.

Modifications Etc.

It should be understood that the scope of the invention is not restricted by the above-described embodiments but a material, dimension and detailed arrangement of the respective components and the like can be altered in implementing the invention.

For instance, though the object to be attached to the sheet 2A and the pipe-shaped part 2 (adherend) is the belt 3 in the respective exemplary embodiments, the object may alternatively be a tape, wire or other string-shaped objects of different shape. The object to be attached may not be an elongated object but alternatively be mechanical article such as a buckle and a decoration.

The invention claimed is:

1. A piping slider comprising:
    a first slider member having:
        a cavity in which a pipe-shaped part of an adherend is accommodatable;
        a slit that intercommunicates the cavity with an outside, wherein a width of an opening of the slit is greater than a minimum width of the pipe-shaped part to insert the pipe-shaped part into the cavity through the slit;
        a connector configured to be connected to an object; and
        a grip member on which the cavity and the slit are provided;
    a second slider member having:
        a key member insertable into the slit, wherein a width of an opening of the slit with the key member inserted is smaller than the minimum width of the pipe-shaped part; and
        a lock mechanism that restricts a displacement between the key member and the grip member when the key member is inserted into the slit.

2. The piping slider according to claim 1, wherein
    the connector comprises an insertion hole provided in the grip member,
    the second slider member comprises a connector and a grip member and the connector of the second slider member comprises an insertion hole provided in the grip member, and
    the insertion hole provided in the first slider member and the insertion hole provided in the second slider member are provided at positions mutually in communication with each other when the key member is inserted into the slit.

3. The piping slider according to claim 1, wherein
    the lock mechanism is provided by integrally connecting the connector provided on the grip member of the first slider member and a connector provided on a grip member of the second slider member with the object.

4. The piping slider according to claim 1, wherein
    the first slider member has a key member and the second slider member has a slit and a cavity and
    the key member of the first slider member and the key member of the second slider member project beyond their respective cavities and the key member of the first slider member is insertable into the slit of the second slider member, and
    the lock mechanism maintains a connection between the slider members when the key members of the slider members are inserted.

5. The piping slider according to claim 4, wherein
    the second slider member has a grip member and slider members each comprise a support member that connects the grip member and the key member.

* * * * *

UNITED STATES PATENT AND TRADEMARK OFFICE
CERTIFICATE OF CORRECTION

PATENT NO. : 9,266,205 B2  
APPLICATION NO. : 13/805634  
DATED : February 23, 2016  
INVENTOR(S) : Yuu Hashimoto Page 1 of 1

It is certified that error appears in the above-identified patent and that said Letters Patent is hereby corrected as shown below:

In the Specification

In column 10, line 63, delete "convexoconcave" and insert -- convex-concave --, therefor.

In column 11, line 1, delete "Etc." and insert -- etc. --, therefor.

In the Claims

In column 12, line 31, in claim 5, after "member and" insert -- the --.

Signed and Sealed this
Thirty-first Day of May, 2016

Michelle K. Lee
*Director of the United States Patent and Trademark Office*